US005233226A

United States Patent [19]
Hanover et al.

[11] Patent Number: 5,233,226

[45] Date of Patent: Aug. 3, 1993

[54] IGNITION SYSTEM FOR GASOLINE POWERED BOATS

[75] Inventors: Timothy Hanover, Londonderry, N.H.; Chester V. Braun, Jr., Boulder Creek, Calif.

[73] Assignee: Master Mariner, Inc., Dover, N.H.

[21] Appl. No.: 667,467

[22] Filed: Mar. 11, 1991

Related U.S. Application Data

[63] Continuation-in-part of Ser. No. 452,206, Dec. 15, 1989, abandoned, which is a continuation-in-part of Ser. No. 270,537, Nov. 14, 1988, abandoned.

[51] Int. Cl.[5] .................... B63J 2/06; B60L 1/00

[52] U.S. Cl. .................... 307/9.1; 114/211; 123/179.3; 340/984; 454/78

[58] Field of Search .................... 307/9.1, 41, 39, 326, 307/328, 116, 141.4; 114/211; 361/1; 340/984, 632–634; 440/1, 85, 88; 98/1, 10, 14, 33.1, 50; 123/41.56, 41.58, 179 R, 179 B, 179 BG, 179 A, 179 D, 179.1, 179.3–179.6; 454/78, 188

[56] References Cited

U.S. PATENT DOCUMENTS

| | | | |
|---|---|---|---|
| 3,789,231 | 1/1974 | Hayden | 307/9.1 |
| 3,948,202 | 4/1976 | Yoshikawa | 114/211 |
| 4,037,578 | 7/1977 | Dersch et al. | 123/179 BG |
| 4,134,112 | 1/1979 | Kercheval et al. | 340/632 |
| 4,185,605 | 1/1980 | Largent, Sr. | 123/179 B |
| 4,235,181 | 11/1980 | Stickney | 114/211 |
| 4,473,025 | 9/1984 | Elliot | 114/211 |

*Primary Examiner*—Marc S. Hoff
*Assistant Examiner*—Richard T. Elms
*Attorney, Agent, or Firm*—Lee A. Strimbeck

[57] ABSTRACT

A gasoline powered boat safety ignition system has a start timer that requires the engine room blowers to operate for a time prior to allowing engine start up. It has a second timer sequence that permits a hot or warm start shortly after the engine has been shut down without as much of a delay for blower operation as for a cold start. Also, the system has a timer that cyclically turns the blowers on for short periods while the engine is operating and has a switch for overriding the safety system in case of an emergency.

19 Claims, 7 Drawing Sheets

IGNITION SYSTEM FOR GASOLINE POWERED BOATS

RELATED APPLICATION

Figure 1:
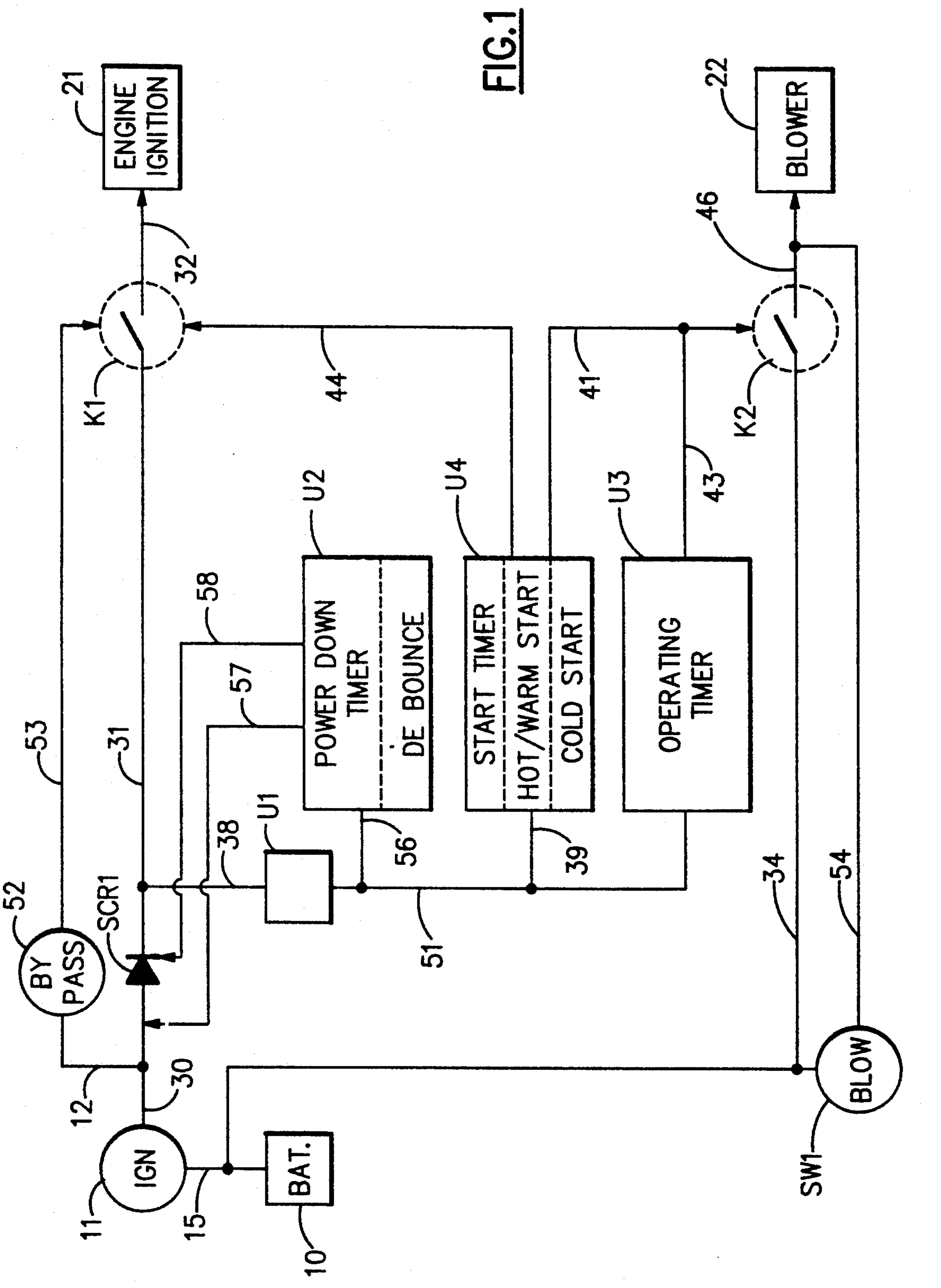

This application is a continuation-in-part of an application by the same inventor and having the same title, Ser. No. 07/452,206 filed Dec. 15, 1989, which in turn was a continuation-in-part of Ser. No. 07/270,537 filed Nov. 14, 1988, both now abandoned.

The present invention is a safety electrical system that prevents power from being supplied to an enclosed area that may contain explosive fumes until blowers have had an opportunity to purge the area. More particularly the present invention is an ignition system that prevents the engine of a gasoline powered boat from being turned on until the engine blowers have operated for a period sufficient to purge the engine room of possibly explosive vapors.

INTRODUCTION

U.S. Coast Guard regulations require all gasoline powered boats that have enclosed engine spaces to be equipped with exhaust blowers to purge explosive gases prior to starting the engine. The blowers are required to be operated for a full four minutes prior to starting the engine.

These exhaust blowers are installed by boat builders as required by law. Unfortunately there has been no feasible way to enforce the proper use of these safety devices. A report published by the Department of Transportation, U.S. Coast Guard, "Boating Statistics 1987" June, 1988 states that over the past five years forty-four people have been killed, nine hundred eighty-seven injured and nearly twenty million dollars in damages have occurred as a direct result of gasoline fuel explosions and resulting fires in gasoline engine powered crafts. For comparison the total amount of damages over the past five years for all types of boating accidents was approximately eighty-three million dollars. Thus, the loss caused by gasoline fuel—fire explosions was an alarming twenty-four percent of all losses.

The above statistics are based on reports received by the U.S. Coast Guard who estimate that these amount to only five to ten percent of all reportable accidents not involving fatalities. Also, these statistics are only for those jurisdictions that have a federally approved boat numbering system.

There has been a desideratum therefore for an ignition system or method that would compel a gasoline powered boat operator to operate the blowers for an adequate period of time prior to engine start up, which system none-the-less must be acceptable to the operator and not unduly frustrating or complicated. The present invention is directed to this need.

THIS INVENTION

The present invention is an electronic interlock or device designed specifically to prevent fuel explosions and fire caused by a build-up of explosive fumes in enclosed compartments such as battery rooms, paint rooms, areas that may contain natural or propane gas fumes and the engine rooms and auxiliary spaces of power boats. It may be used in any other confined area on land or sea which should be purged of explosive vapors prior to starting an engine or otherwise supplying electrical power thereto.

The present system is designed to automatically bypass the ignition system of an engine and simultaneously power and operate the exhaust blower until it is safe to start the engine. Generally speaking in the case of boats the blowers will automatically operate for a predetermined period of time; e.g., full four minutes, while preventing the flow of current to the starter motor thus eliminating any possibility of a spark igniting any explosive vapors. After this predetermined period of time, the electronic interlock system stops the blower and allows the operator to start the engine. If after the predetermined period of time the operator does not start the engine and after a period attempts to do so the present system will again run the exhaust blower for another predetermined amount of time to assure purging of the engine space before allowing engine start up. This cycle will automatically be repeated so long as the ignition switch is in the "on" position.

In addition to insure safety after the boat has been started and during the time that it is in operation, the blowers will be automatically turned on to purge the confined areas for a predetermined period of time on a regular basis. This is especially important when trolling or running at reduced speeds to assure sufficient air flow to the engine room spaces.

To accommodate instances of extreme emergency where the boat must be started immediately to avoid certain disaster an emergency bypass switch is provided that will allow the boat engine to be started immediately while still running the exhaust blowers. To use the bypass the operator must purposely turn the ignition switch to the start position with one hand and activate the bypass switch with the other simultaneously.

The safety interlock ignition system of this invention provides maximum safety for the boat operator, passengers, marine facilities and other boats. It is "boater friendly" with sensible features that include a cold start, warm start, hot start, automatic blower cycling and an emergency bypass system.

When the ignition switch is turned to the "off" position the system automatically powers itself down.

The exhaust blowers may still be operated at any time by a manual switch on the dash board. Statistics have shown however that operators do not run the exhaust blowers for the proper amount of time to sufficiently purge the confined spaces of explosive gases or forget to run the blowers at all prior to starting the engine. An operator only has to forget once when there are explosive fumes present to cause considerable damage and possible death. It should be noted that boat operators are not required by law to take any type of test of boating knowledge or safety requirements prior to being allowed to operate a pleasure boat of any size!!

In brief compass the present invention is a safety interlock system for a gasoline powered boat having a gasoline engine within an engine room and the engine room being equipped with a blower to purge fumes. The blower is equipped with a blower switch and the gasoline engine is equipped with a customary ignition system including an ignition switch, a starter switch and a power supply connected to the blower switch and ignition switch.

The safety interlock system of this invention comprises a cold timer switch and an ignition interlock. The cold timer switch is operatively connected to the ignition relay switch and blower switch. The ignition interlock is interposed between the starter switch and the ignition switch. In operation when the starter switch is turned "on", it energizes the cold timer switch which in turn energizes (1) the blower switch for a first predetermined time period and (2) the ignition interlock preventing energization of the ignition switch. After the first predetermined period of time has passed the cold timer switch ceases the energization of the blower switch and releases the ignition interlock permitting the ignition to be energized and power to go to the engine ignition system and starter.

It is preferred in addition to include a warm/hot time switch connected to the starter switch and the ignition interlock such that when the starter is turned on after the engine has operated for a time, the warm/hot time switch observes the time since shut down and if longer than a second predetermined time it first turns on the blowers while preventing an engine start up until a sufficient time has passed to assure purging of the engine compartment. Generally speaking the time the blowers are kept on is proportional to the time period the engine was not running.

For emergency situations the system preferably has a bypass switch connected to the ignition interlock. It is physically positioned to require the operator to operate the bypass switch with one hand while operating the ignition switch with the other such that when both are in the "on" position the ignition can be energized and the engine started in emergencies such as the boat drifting into shallow waters. The system of this invention is designed to fail "open" so that if the bypass must be used a conscious decision must be made which hopefully will make the operator think to first operate the blowers to purge the engine room.

Also as an additional feature the interlock system of this invention has an operating time that cyclically turns the blower on for short periods periodically to assure that the engine room remains free of explosive fumes. This is done automatically which frees the operator from the need to consider whether or not the blowers should be turned on.

DRAWINGS

Figure 2:
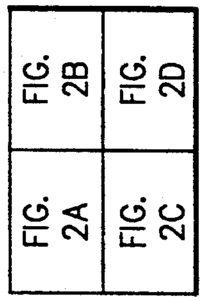
Figure 2B:
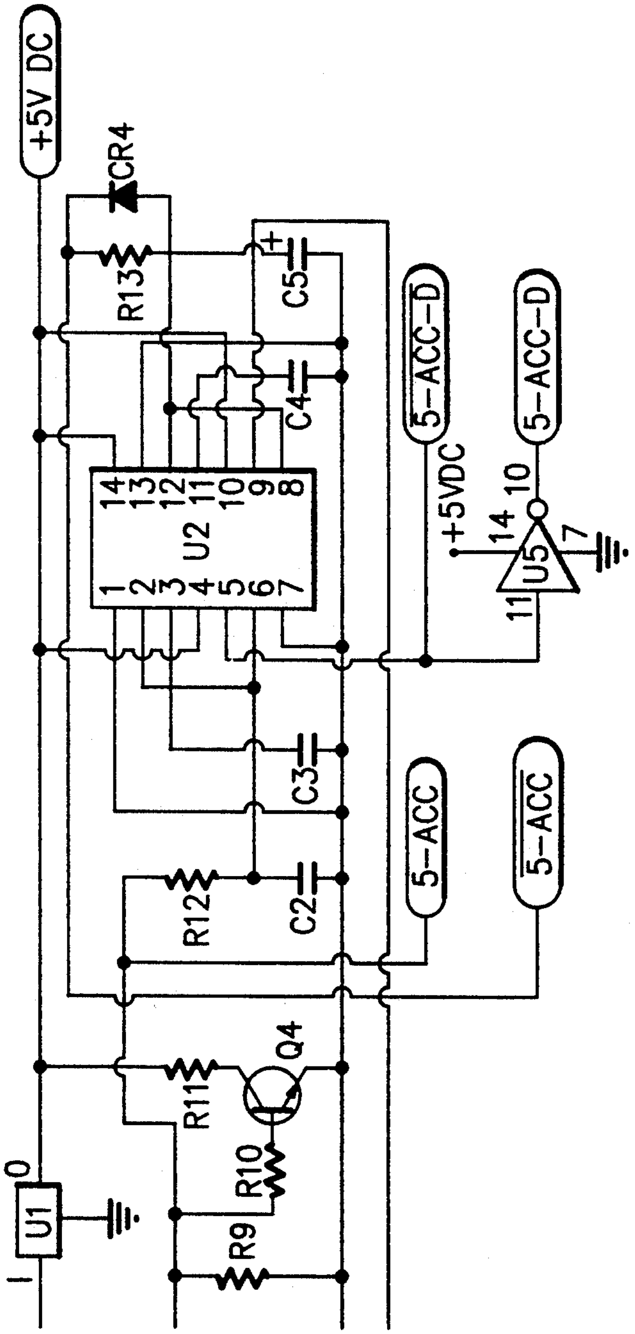
Figure 2A:
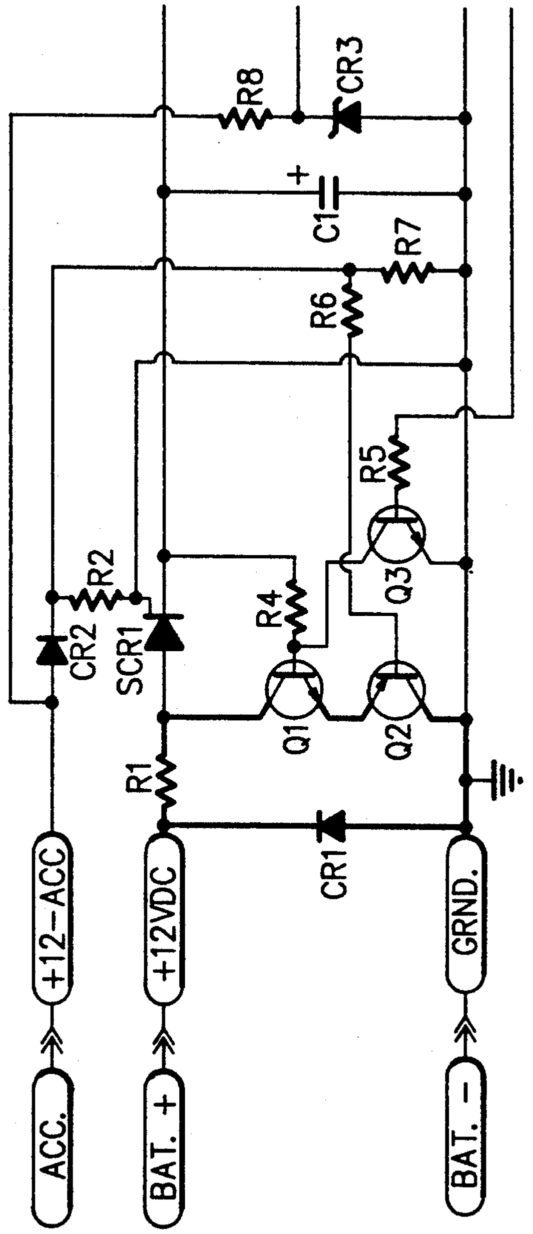
Figure 2C:
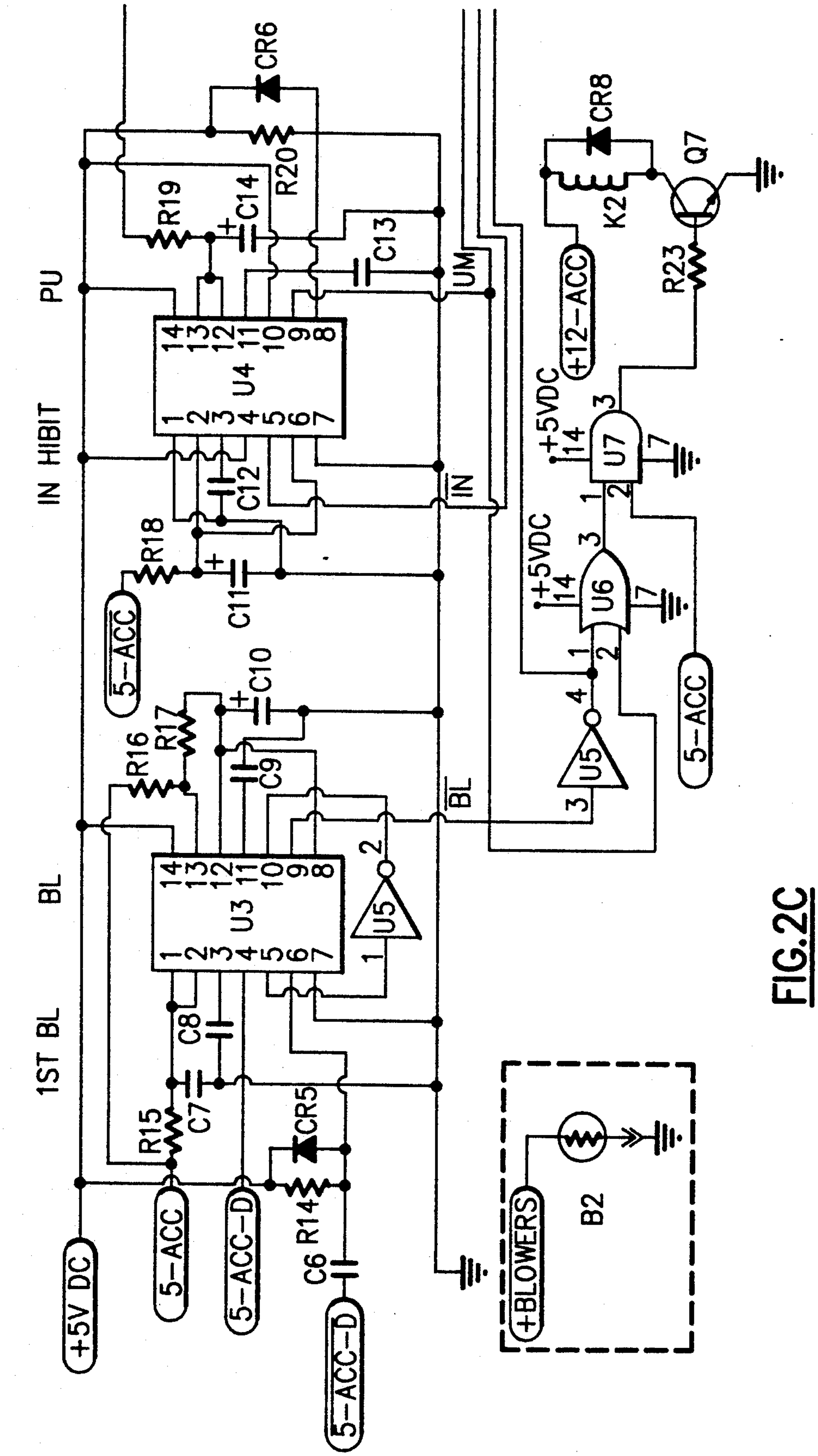
Figure 2D:
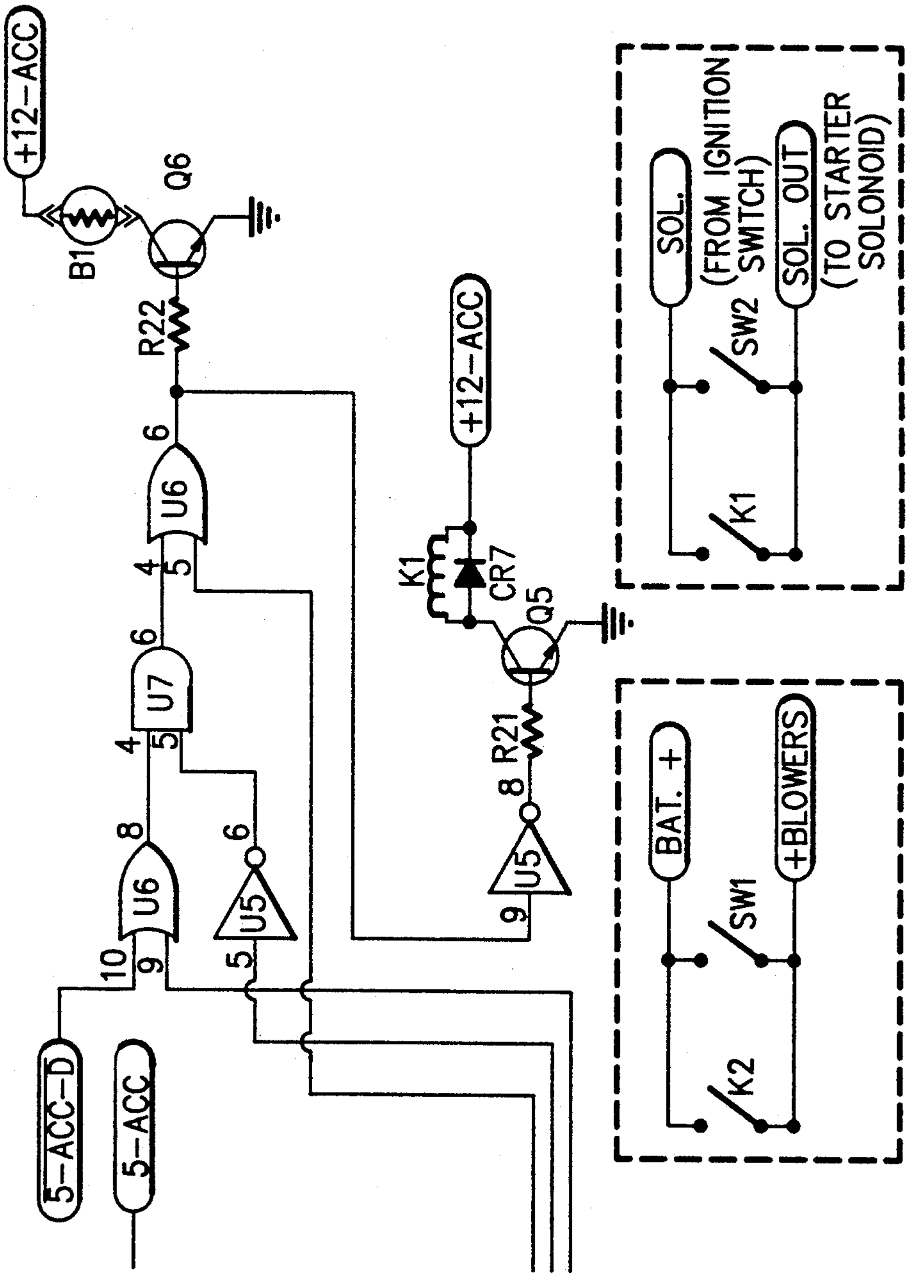
Figure 3:
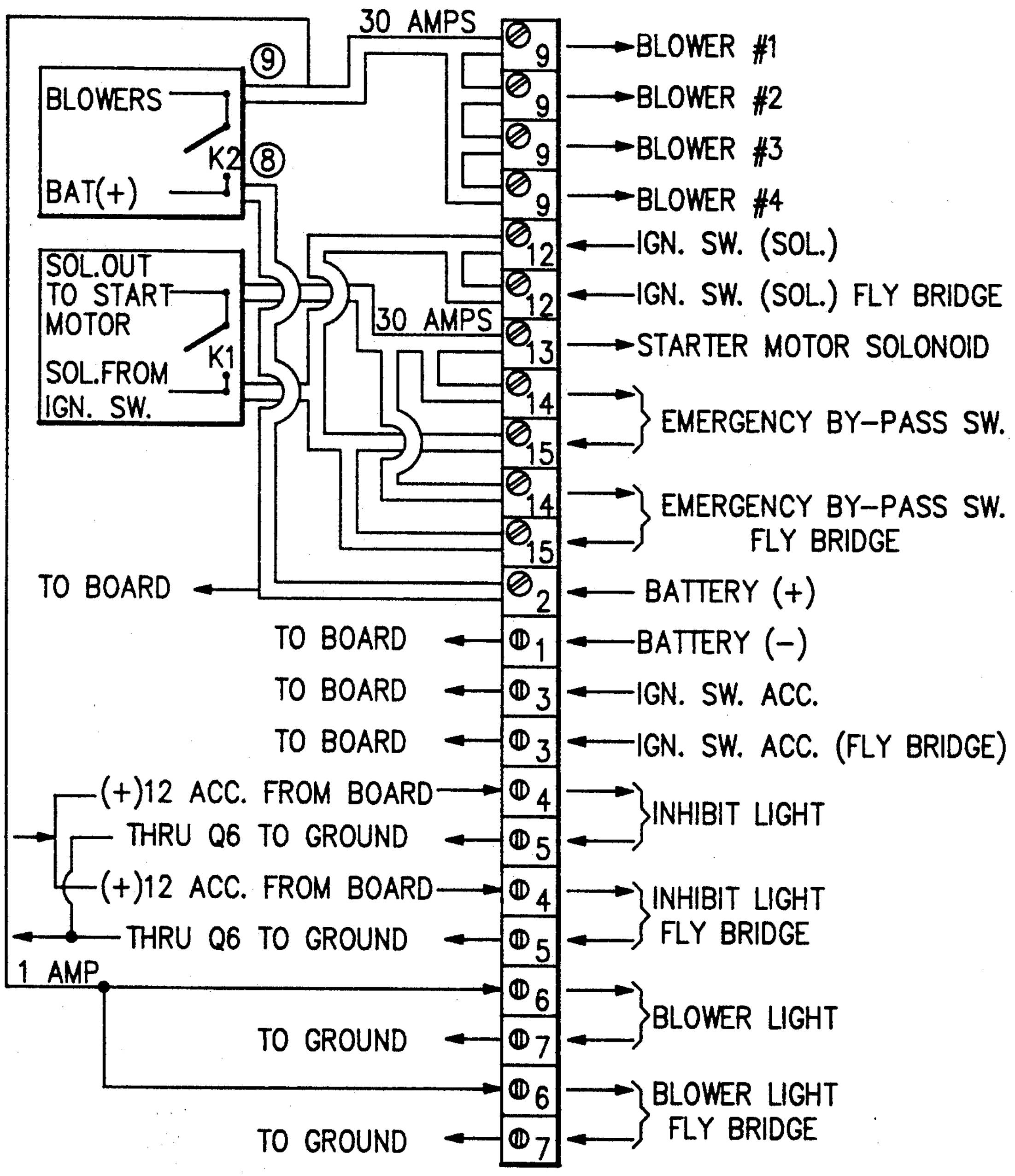
Figure 4:
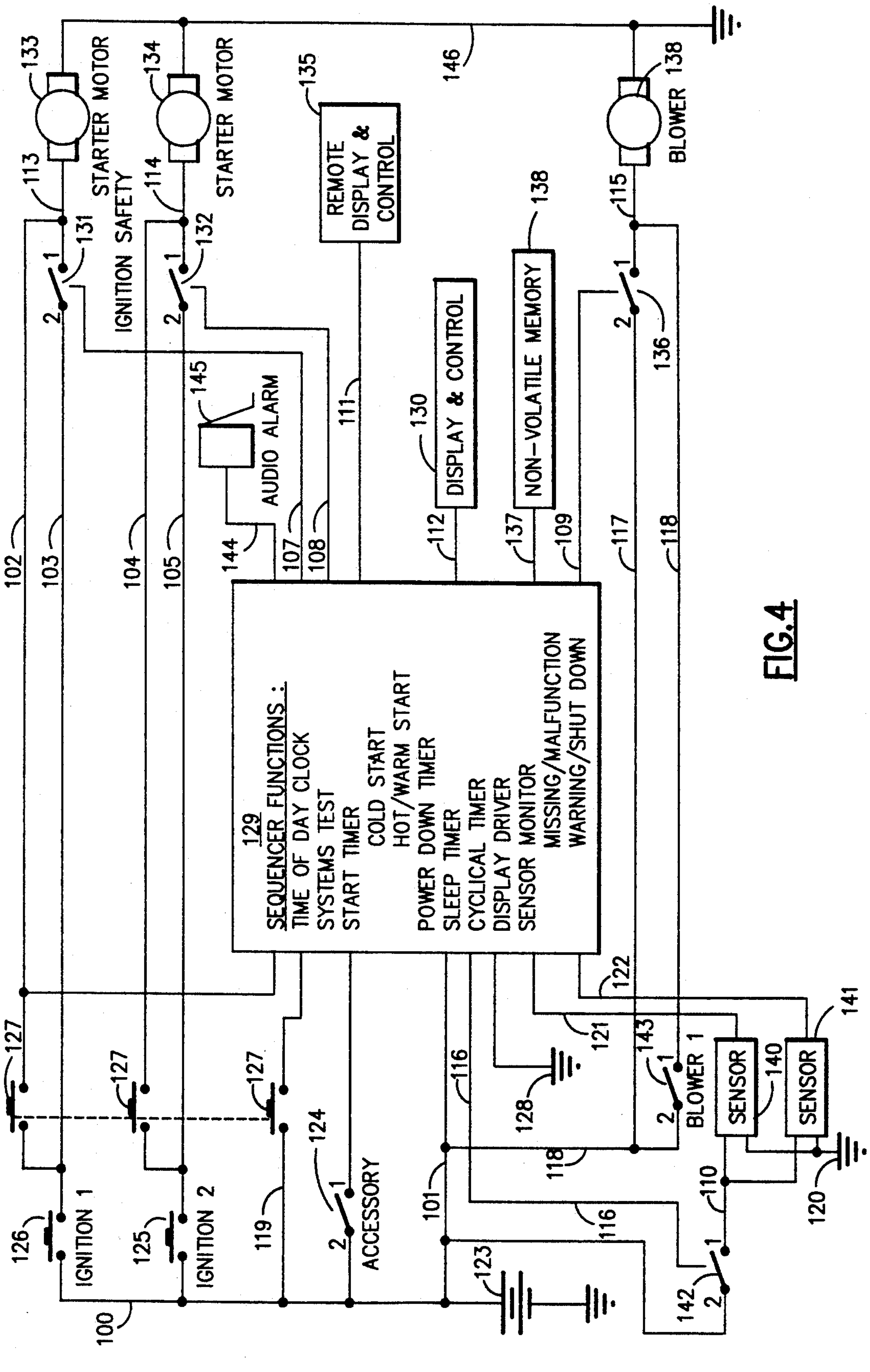

In the drawings:

FIG. 1 is a schematic illustration of an analog safety ignition system according to this invention, FIG. 2 is a detailed wiring diagram broken down for reason of clarity into four schematics, FIGS. 2A, 2B, 2C and 2D, FIG. 3 is a self explanatory contact layout of the FIG. 2 diagram, and FIG. 4 is a digital safety ignition system according to this invention and which includes some additional features not shown in the system of FIG. 1.

DESCRIPTION

Referring to FIG. 1, illustrated is a boat ignition system. This comprises a 12 volt source of power, battery 10, which by line 15 connects to ignition switch 11 which by line 30 supplies power to a silicon controlled rectifier SCR 1. SCR 1 connects by line 31 to ignition relay K1. Lines 33 and 34 supply power to blower relay switch K2. Power is also directly supplied by line 33 to blower switch SW1 and thence by lines 54 and 46 to a blower 22. Thus, the blower can be operated in the usual manner independently of the present ignition safety system.

SCR 1 is connected by lines 31 and 38 to regulator U1 which reduces the voltage from 12 to 5 volts. Regulator U1 is connected by lines 51 and 39 to a start timer U4 and by line 51 to operating timer U3.

Switch 11 connects by line 30 and 12 in series to bypass switch 52 on the instrument panel. Line 53 connects the bypass switch to relay K1.

In accordance with this invention timer U4 is connected by line 44 to relay K1. The relay switch K1 will not close unless activated by timer U4 or by bypass switch 52.

The engine ignition system is indicated at 21 and the blower or blowers are indicated at 22.

In operation when ignition switch 11 is turned on and relay switch K1 is in the open position, power flows via line 38 regulator U1 and lines 51 and 40 to the start timer U4. The timer is a count up/down timer. If the engine has not been operating, i.e., for a cold start, the timer by line 41 activates the blower relay K2 so that the blower relay can pass power by line 46 to blower 22 to cause it to operate. The cold timer counts down for a predetermined time period and after that time period shuts down the blower 22 and activates by line 44 the ignition relay K1 such that 12 volt power can flow via lines 30, 31 and 32 to the engine ignition 21 starting the engine.

In an emergency the operator by turning both ignition switch 11 and bypass switch 52 on simultaneously ran pass by line 53 energizing current to the ignition relay K1 which permits direct starting of the engine. Also, prior to star&: up or at any other time, the operator by turning blower switch SW1 on can pass current directly to the blower 22 by line 54.

After the engine has been operating for a time and shut down it may not be necessary to purge the engine compartment for a predetermined time period prior to start up. When the engine is shut off timer U4 commences counting down for say, a period of twenty minutes. If the engine is attempted to be turned on again within that time at the time of engine shut off the timer commences counting how long the engine has been shut off. If it has been shut off for more than one minute, for example, timer U4 is set to prevent the engine start up by not energizing K1 while turning the blowers relay on by line 41 for a time period of say two minutes to insure purging of the engine compartment. Thereafter the timer shuts off the blower and activates the ignition interlock allowing engine ignition.

Experience has shown that it is advisible to operate the blowers periodically in an operating vessel to assure that the engine room is purged of any explosive vapors especially while operating at low speeds or down wind where there may be very little ventilation. To this end the present system includes an operating timer U3, which when the ignition switch is on is activated by power from line 51 and automatically turns the blower on, for example, one minute out of each twenty by activating the blower relay via lines 43 and 46. The blower is kept cycling while the engine is operating.

When ignition 11 is turned off it is necessary to keep power to the system to allow timer U4 to operate so that start up will be permitted within, for example, a twenty minute period with less than a four minute delay for blower operation. To this end a power down timer U2 is inserted into the circuit. It is connected to regulator U1 by lines 51. and 56. Timer U2 is an up only counter and counts how long switch 11 has been in the off position. When the switch has been in the off position for say, a period of twenty continuous minutes, timer U2 and its related components by line 57 pulls the anode of SCR 1 to ground while a +12 volt potential is applied to the cathode by line 58. This reverse polarity turns SCR1 off thus turning off power to the circuit. If switch 11 is turned on the power down cycle is stopped instantly (via Q2—see FIG. 2).

The power down timer U2 will only power the circuit down when the ignition switch has been in the off position for the twenty continuous minutes. Any time switch 11 is turned on timer U2 is zeroed (the charge on C5, see FIG. 2, is dumped) and the full twenty minutes in the off position is again needed for a power drain to occur.

With reference to FIG. 2, the components identified thereon are described in the following listing. The same designations are used in FIGS. 1 and 2 for the following components: SCR1, U2, U3, U4, K1, K2 and SW1.

When the ignition switch 11 is turned on a voltage is applied to the gate of SCR1 allowing it to conduct power to the circuit. When power is first applied to the circuit the output of the cold start circuit U4 second stage will be high. This will enable the blower and the blower light B2 by energizing coil K2 thus closing the contacts K2. The circuit will also light the inhibit light B4 as well as inhibiting the ignition. The timer U4 commences to start to count up by an increasing charge on C14. When the timer U4 has reached its terminal count, for example, four minutes, the blower K2 and the inhibit light will shut off. The circuit will then enable ignition by energizing coil K1 thus closing the contacts of K1.

The start timer U4 is a chip acting as an up/down timer. This timer counts up when ignition switch is on and down when ignition switch is off. This means that if the circuit is powered up and the ignition switch is left in the on position for say three minutes then turned to the off position for say one minute and turned back to the on position the circuit has counted up three minutes and down one minute thus leaving two more minutes necessary in the on position to reach the four minute power time.

For a hot/warm start the timer U4 counts how long the ignition switch has not been in the on position. If an ignition is tried after the switch has not been in the on position for greater than one minute, for example, the inhibit light is lit ignition is inhibited and the blower operated until the inhibit timer U4 has counted down with the ignition switch in the on position for the predetermined amount of time. This can be set depending on how long the starter switch has been off. After this predetermined time the inhibit light will then turn off and ignition will be enabled by energizing K1.

U4 is set however such that if the ignition has been off for less than one minute immediate energizing of K1 will take place and immediate start up will thus be allowed.

After the blowers have gone through their initial cold start cycle timer U3 will then cause the blowers to cycle, for example, for one minute out of every twenty minutes by energizing K2. Since the blower light B2 is wired in parallel with the blowers any time the blowers are on the blower light will also be lit.

It should be noted that the circuit will not cause the blowers to cycle unless the starter switch is in the on position. Once the start cycle has been completed and the key is in the on position the blowers will cycle for one minute every twenty minutes via timer U3.

Power down timer U2, second stage, is an up only counter. This counter counts how long the ignition switch has been in the accessory off position. When the ignition switch has been in the off position for say, twenty continuous minutes the timer will turn off Q3 which will turn on Q1 which enables current to flow through Q2 (normally on). This will pull the anode of SCR1 to ground while C1 will provide 12 volts to the cathode. This reverse polarity will turn the SCR1 off thus turning off power to the circuit. If the ignition switch is turned to the on position the instant the current is being powered down Q2 will turn off stopping the power down cycle.

The power down timer U2 will only power the cycle down when the ignition switch has been in the off position for the twenty continuous minutes. Any time the ignition switch is turned to the on position the power down timer is zeroed, i.e., the charge on C5 is dumped and a full twenty minutes in the off position is again needed for a power down to occur.

An up/down timer U2, stage one, is used to debounce the signal from the ignition switch when the signal changes state (ON—OFF, OFF—ON). It must remain in that state for at least say, 0.5 seconds before the debounce circuitry will acknowledge it is a valid change of state.

If the operator turns on blower override switch SW1 the blowers will turn on and the blower light B2 will light. This will happen regardless of the state of the circuit or the position of the ignition switch.

If the operator turns on the ignition override switch 52 all inhibit circuitry is bypassed and the starter may be activated by turning the ignition switch to the on position. The override switch is a momentary switch that must be held in the on position.

All times given in the above description are exemplar only and can be adjusted as need be to fit an desired operating parameters.

As an additional inventive feature, it is believed that the use of a timing chip (integrated circuit) in conjunction with the logic chip to effect retentive/non retentive up/down timing and to avoid race conditions is novel.

In summary, the gasoline engine powered boat safety ignition analog system illustrated in FIGS. 1–3 does the following.

Cold Start: Locks out all current flow to the ignition system while powering the exhaust blowers for a predetermined period; e.g., four minutes.

Warm Start: Blocks out all current flow to the ignition system after the ignition system has been off for more than one minute and up to twenty minutes while powering the exhaust blowers for a predetermined period.

Hot Start: Allows ignition to start immediately for up to, for example, one minute every twenty.

Emergency Bypass: Allows the operator to bypass the interlock system in cases of dire emergencies such as imminent collision or grounding while still operating the exhaust blowers.

Turning now to the digital system of FIG. 4, illustrated is a boat ignition system. This comprises a 12 volt source of power battery 123 which by line 100 connects to ignition switches 125 and 126 which by lines 103 and 105 supplies power to electronically controlled ignition safety switches 131 and 132. Power is also supplied via line 118 to manual blower switch 143, via line 117 to the electronically controlled blower switch 136, to the accessory switch 124 and to the electronically controlled sensor power switch 142 through line 100. Switch 142 supplies power through line 110 to gas sensors 140 and 141.

Ignition switches 125 and 126 connect by lines 103 and 105 to bypass (or override) switch 127 that is operated manually. Lines 102 and 104 connect the override switch 127 directly to starter motors 133 and 134 bypassing ignition safety switches 131 and 132.

In accordance with this invention sequencer 129 is connected by lines 107 and 108 to switches 131 and 132. Sequencer 129 is based on a software programmed microprocessor chip to have the functions shown in FIG. 4 and such others as may be desired. The electronically controlled switches 131 and 132 will not close unless activated by the sequencer 129. The sequencer 129 is also connected by line 116 to switch 142. The electronically controlled switch 142 will not close unless activated by the sequencer 129. The sequencer 129 is connected by line 109 to the electronically controlled blower switch 136. The blower or blowers 138 cannot be operated unless activated by the manual blower switch 143 or the electronically controlled blower switch 136.

The sequencer 129 is powered directly from the battery by line 101 and is in operation continuously. When the accessory switch 124 is turned on line 106 signals the sequencer. The sequencer 129 first performs a self test or systems test and notifies the display unit 130 of the results of this test. The sequencer 129 then activates by line 116 the sensor power switch 142 supplying power to the sensors 140 and 141 by line 110. If the engine has not been operating, i.e., for a cold start, the sequencer by line 109 activates the blower switch 136 so that the blower switch 136 can pass power by line 115 to blower 138 to cause it to operate. The cold start timer within the sequencer 129 counts down for a predetermined time and after that time period shuts down blower 138. The sequencer 129 then reads the sensors 140 and 141 by lines 121 and 122 to detect the presence of dangerous gases. If there are no dangerous gases detected the sequencer turns on the blowers 138 by line 109 for a predetermined period of time and then activates by lines 107 and 108 the ignition safety switches 131 and 132 such that when the ignition switches 125 and 126 are manually activated power can flow by lines 103, 105, 113 and 114 to the engine starter motors 133 and 134 The sequencer 129 then enters a normal mode of operation during which the sensors are read at predetermined time intervals.

If the sequencer 129 by lines 121 and 122 from the sensors 140 and 141 detects the presence of dangerous gases before activation of the ignition safety switches 131 and 132 then the blower switch 36 remains activated and a warning message is displayed on the sequencer 129 display unit 130. While dangerous gases are detected the ignition safety switches 131 and 132 will remain disabled. The sequencer 129 will continue to periodically monitor the sensors 140 and 141 by lines 121 and 122. The warnirg message will be displayed and the blowers 138 will remain on until the sequencer 129 detects the absence of such dangerous gases. At such time the sequencer 129 will activate the ignition safety switches 131 and 132 by lines 107 and 108.

If the sequencer 129 by lines 121 and 122 from the sensors 140 and 141 detects the presence of dangerous gases after entry into the normal mode of operation the ignition safety switches 131 and 132 will be deactivated by lines 107 and 108 and the blower switch 136 will be activated by line 109 turning on the blowers 138. The sequencer will send by line 112 a warning message to the display unit 130 and continue to periodically monitor the sensors 140 and 141 by lines 121 and 122. The warning message will be displayed and the blowers 138 will remain on until the sequencer 129 detects the absence of such dangerous gases. At such time the sequencer 129 will activate the ignition safety switches 131 and 132 by lines 107 and 108.

If the sequencer 129 by lines 121 and 122 from the sensors 140 and 141 detects a missing or malfunctioning sensor 140 or 141 then a warning is displayed by line 112 on the display unit 130 and an audible alarm 145 is activated by line 144. Additionally, the sequencer 129 will deactivate the ignition safety switches 131 and 132 thereby not allowing the manual ignition switches 125 and 126 to operate unless the manual bypass switch 127 is operated at the same time.

In an emergency, the operator by turning both the ignition switches 125 and 126 and the bypass switch 127 on simultaneously can pass by lines 102 and 104 current to the starter motors 133 and 134 thereby directly starting the engines. Also, before start up or at any other time, the operator by turning blower switch 143 on can pass current directly to the blowers 138 by line 118.

After the engine has been operating for a time and shut down it may not be necessary to purge the engine compartment for the full predetermined period of time before start up. When the engine is shut off a timer within the sequencer 129 begins counting down from a calculated starting point. When the engine is again started a calculation is made within the sequencer 129 to determine the start up safety hold period. If a short period of time has passed the safety period duration is lessened and this is termed a warm start. If a very short period of time has elapsed between shut down and start up then immediate start up may be allowed and this is termed a hot start.

Experience has shown that it is advisable to operate the blowers periodically in an operating vessel to assure that the engine room is purged of any explosive vapors especially while operating at low speeds or down wind where there may be very little ventilation. To this end the present system includes an operating timer within the sequencer 129 which when the accessory switch 124 is active automatically turns the blowers 138 through blower switch 136 by line 109 on periodically for predetermined periods of time. The blower is kept cycling in this manner while the engine is operating.

The display and control unit 130 displays all warning and danger messages. When the safety period is in effect the display unit shows the time remaining in minutes and seconds. When the sequencer 129 is in normal operating mode and there are no safety periods or warnings in effect the display unit 130 displays the time of day. When the sequencer 129 is in standby mode with the accessory switch 124 inactive the display 130 will conserve battery power by not displaying any information.

When the sequencer 129 is in standby mode by the accessory switch 124 being inactive the sequencer 129 may be put into sleep mode by activating the controls on the display and control unit 130. While in sleep mode the sequencer 129 will periodically apply power to the sensors 140 and 141 through the sensor power switch 142 by line 116. After the sensors 140 and 141 have stabilized the sequencer 129 will detect dangerous gas that may be present. If dangerous gas has been detected the sequencer will sound the audible alarm 145 by line 144 and display a visual warning message at the display unit 130 by line 112 and activate the blower switch 136 by line 109 to exhaust the gas. If no dangerous gas has been detected the sequencer 129 will deactivate the sensor power switch 142 by line 116 and resume sleep mode until the next periodic gas check.

The display and control unit 130 will additionally have a switch for setting the time of day and two visual indicators, one to indicate blowers activate and the other to indicate an ignition safety switch inactive state.

There will optionally be a remote display and control unit 135 that will have the two visual indicators and an audible alarm connected to sequencer 129 by line 111 identical to those in the display and control unit 130 and a bypass switch functionally identical to 127.

Throughout its operating modes sequencer 129 maintains a record of its current state in non volatile memory 138 connected to the sequencer by line 137. For example, if the bypass switch 127 is used the sequencer will be informed by line 119. If a gas explosion should result from bypass switch 127 being used while dangerous gas was present this action would be recorded in the non volatile memory 139.

What is claimed is:

1. A safety ignition system for a power boat, said boat having a hydrocarbon fueled engine within the engine room and said engine room being equipped with a blower and a vent to purge fumes therefrom, said blower being equipped with a blower switch and said engine being equipped with an ignition system including an ignition switch and a starter and a power supply connected to said ignition switch through said starter switch and to said blower switch, said safety ignition system comprising:

a cold start timer switch operatively connected to said ignition switch and said blower switch, said starter switch in the "on" position energizing said cold start timer switch which in turn (1) energizes said blower switch for a first predetermined time period and after said first predetermined time (2) energizes said ignition switch to permit power to go to said ignition system; and a warm/hot timer switch connected to said starter switch which when said starter switch is turned to the "on" position after said engine has operated for a time and has been shut down said warm/hot start timer switch observing the down time and if said down time is greater than a second predetermined time said warm/hot start switch energizing said blower switch and not energizing said ignition switch until after a third predetermined time has passed sufficient to assure purging of said engine room and if said down time is less than said second predetermined time, said warm/hot start timer switch permitting energization of said ignition switch.

2. The safety ignition system of claim 1 wherein said cold and warm/hot start timer switches are integral and comprised of a timing chip.

3. The safety ignition system of claim 1 comprising in addition a bypass switch in series with said ignition switch and connecting to said ignition switch, said bypass switch bypassing said safety ignition system and providing power directly to said ignition switch and being positioned to require the operator to operate the bypass switch with one hand while operating the ignition switch with the other, both switches when in the "on" position energizing the ignition system and permitting engine start up.

4. The safety ignition system of claim 1 wherein said cold timer switch ceases energization of said blower after said first predetermined time and comprising in addition an operating timer switch connected to said blower switch cyclically energizing said blower switch when said engine is operating.

5. A safety ignition system for a power boat, said boat having a hydrocarbon fueled engine within an engine room and said engine room being equipped with a blower and a vent to purge dangerous gases therefrom, said blower being equipped with an electronically controlled blower switch and said engine being equipped with an ignition system including an electronically controlled ignition switch, a starter switch and a power supply connected to said electronically controlled ignition switch through said starter switch and to said electronically controlled blower switch, said safety ignition system comprising:

a sequencer having (i) a cold start function and operatively connected to said electronically controlled engine switch and said electronically controlled blower switch said starter switch is the "on" position signalling said sequencer which in turn (1) energizes said electronically controlled blower switch for a first predetermined time period and after said first predetermined time (2) energizes said electronically controlled ignition switch to permit power to go to said ignition system and (ii) a warm/hot timer function operatively connected to said starter switch, when said starter switch is turned to "start " position after said engine has operated for a time and has been shut down said warm/hot timer function within said sequencer observing the down time and if said down time is greater than a second predetermined time said warm/hot timer function energizing said electronically controlled blower switch and not energizing said electronically controlled ignition switch until after a third predetermined time has passed sufficient to assure purging of said engine room of said dangerous gases and if said down time is less than said second predetermined time, said warm/hot timer function permitting energization of said ignition switch.

6. The safety ignition system of claim 5 wherein said cold and warm/hot start timer functions are integral and comprised of a single microprocessor chip.

7. The safety ignition system of claim 5 comprising in addition to bypass switch in series with said ignition switch and connecting to said electronically controlled ignition switch, said bypass switch being positioned to require the operator to operate said bypass switch with one hand while operating said ignition switch with the other hand, said bypass switch in the "on" position and said ignition switch in the "start" position energizing the ignition relay and permitting engine start up.

8. The safety ignition system of claim 7 wherein said cold timer function ceases energization of said blower relay after said first predetermined time and comprising in addition an operating timer function within said sequencer connected to said electronically controlled blower switch cyclically energizing said blower relay switch when said engine is operating.

9. The safety ignition system of claim 7 including audio or visual displays operatively connected to said sequencer and where when said ignition switch is first turned to the "accessory" position said sequencer performs a system test and displays through said audio or visual means the result thereof.

10. The safety ignition system of claim 7 including a gas sensor in said engine room wherein when said ignition switch is first turned to the "accessory" position said sequencer supplies power to said gas sensor thereby preparing the sensor for operation and when said sensor senses a dangerous accumulation of gases, said sequencer disabling the ignition system while allowing said blower to operate.

11. The safety ignition system of claim 10 wherein said gas sensor is missing or malfunctioning said sequencer prevents start up of said engine unless said bypass switch is operated.

12. The safety ignition system of claim 11 comprising in addition a sleep mode function within said sequencer where when the ignition switch is in the "off" position said sequencer periodically applied power to said gas sensor and checks for the presence of dangerous gases in said engine room and activating audio and visual alarms as well as said blower if dangerous gases are present and reverting back to the sleep mode if no dangerous gases are detected.

13. The safety ignition system of claim 9 wherein said sequencer is placed separate from said audio or visual units thereby minimizing space requirements on the dashboard and allowing said sequencer to be positioned in a more protected environment.

14. The safety ignition system of claim 7 comprising in addition a non volatile memory recording the present state of said sequencer and all said electronically controlled switches, said bypass switch and said gas sensor.

15. The safety ignition system of claim 10 wherein the engine is operating said gas sensor is always sensing for dangerous levels of explosive gases and if said sensor detects a dangerous condition said sequencer activates said blower and audible or visual alarms but does not inhibit the ignition system.

16. A safety electrical system for an enclosed area in which an explosive gas mixture may accumulate said area being equipped with a blower and a vent to purge gases therefrom said blower being equipped with an electronically controlled blower switch and said enclosed area having electrically powered equipment therein, said safety electrical system including an electronically controlled equipment switch and a starter switch and a power supply connected to said electronically controlled equipment switch through said starter switch and to said electronically controlled blower switch, said safety electrical system comprising:

A sequencer unit operatively connected to said electronically controlled equipment switch and said electronically controlled blower switch, said starter switch in the "on" position signalling said sequencer which in turn (1) energizes said electronically controlled blower switch for a first predetermined time period and after said first predetermined time (2) energizing said electronically controlled equipment switch and a warm/hot time function within said sequencer connected to said starter switch which when said starter switch is turned to the "start" position after said equipment has operated for a time and has been shut down said warm/hot timer function within said sequencer observing the down time and if said down time is greater than a second predetermined time said warm/hot timer function not energizing said electronically controlled equipment switch until after a third predetermined time has passed sufficient to assure purging of said enclosed area of said dangerous gases and if said down time is less than a second predetermined time, said warm/hot timer function permitting energization of said electronically controlled equipment switch.

17. The safety electrical system of claim 16 wherein said cold and warm/hot start timer functions are integral and comprised of a software programmed microprocessor chip.

18. The electrical ignition system of claim 17 comprising in addition a bypass switch in series with said starter switch said bypass switch by passing said safety electrical system and providing power directly to said electrically powered equipment and being positioned to require the operator to operate said bypass switch with one hand while operating said ignition switch with the other hand, said bypass switch in the "on" position and said ignition switch in the "start" position energizing said electrically powered equipment.

19. The safety equipment system of claim 17 including a gas sensor in said enclosed area electrically connected to said sequencer wherein said sequencer is programmed upon activation and operation of said blower to read said sensor for a determination of a dangerous gas condition and if one exists to prevent powering of said electronically controlled equipment switch or to shut down said electrically powered equipment if operating.

* * * * *